United States Patent [19]

Akiyama

[11] 4,172,039
[45] Oct. 23, 1979

[54] OIL ABSORBERS AND METHOD OF USING THEM

[75] Inventor: Takeo Akiyama, Hatano, Japan

[73] Assignee: Ikeda Bussan Company Limited, Japan

[21] Appl. No.: 798,421

[22] Filed: May 19, 1977

Related U.S. Application Data

[63] Continuation-in-part of Ser. No. 665,175, Mar. 9, 1976, abandoned.

[30] Foreign Application Priority Data

| Mar. 14, 1975 | [JP] | Japan | 50-30832 |
| Jun. 21, 1975 | [JP] | Japan | 50-76379 |
| Jul. 18, 1975 | [JP] | Japan | 50-88620 |
| Oct. 30, 1975 | [JP] | Japan | 50-129882 |

[51] Int. Cl.² .............................................. B01D 39/04
[52] U.S. Cl. .............................. 210/502; 210/DIG. 26
[58] Field of Search ..................... 210/23, 40, 30, 502, 210/508, DIG. 26

[56] References Cited

U.S. PATENT DOCUMENTS

| 3,464,920 | 9/1969 | Pirson | 210/40 |
| 3,617,566 | 11/1971 | Oshima et al. | 210/40 |
| 3,627,677 | 12/1971 | Dyrud | 210/40 |
| 3,703,464 | 11/1972 | Ferm | 210/40 |
| 3,917,528 | 11/1975 | Orban et al. | 210/DIG. 26 |

FOREIGN PATENT DOCUMENTS

1815592  12/1968  Fed. Rep. of Germany ............. 210/40

*Primary Examiner*—Frank Sever
*Attorney, Agent, or Firm*—Robert E. Burns; Emmanuel J. Lobato; Bruce L. Adams

[57] ABSTRACT

A container has, in an upper part thereof, a body of an oleospecific absorbing material, composed mainly of a vegetable substance, preferably coir dust, minutely particulated, having an abundance of fine pores on the surface thereof, impregnated with hydrophobic material to provide a water repellent property and advantageously coated with oil permeable and oil-absorptive materials. This material, in the container, is exposed to mineral oil, floating on the ocean or on industrial waste water or the like. The oil ultimately drains into the container below the material, and is removed therefrom.

1 Claim, 10 Drawing Figures

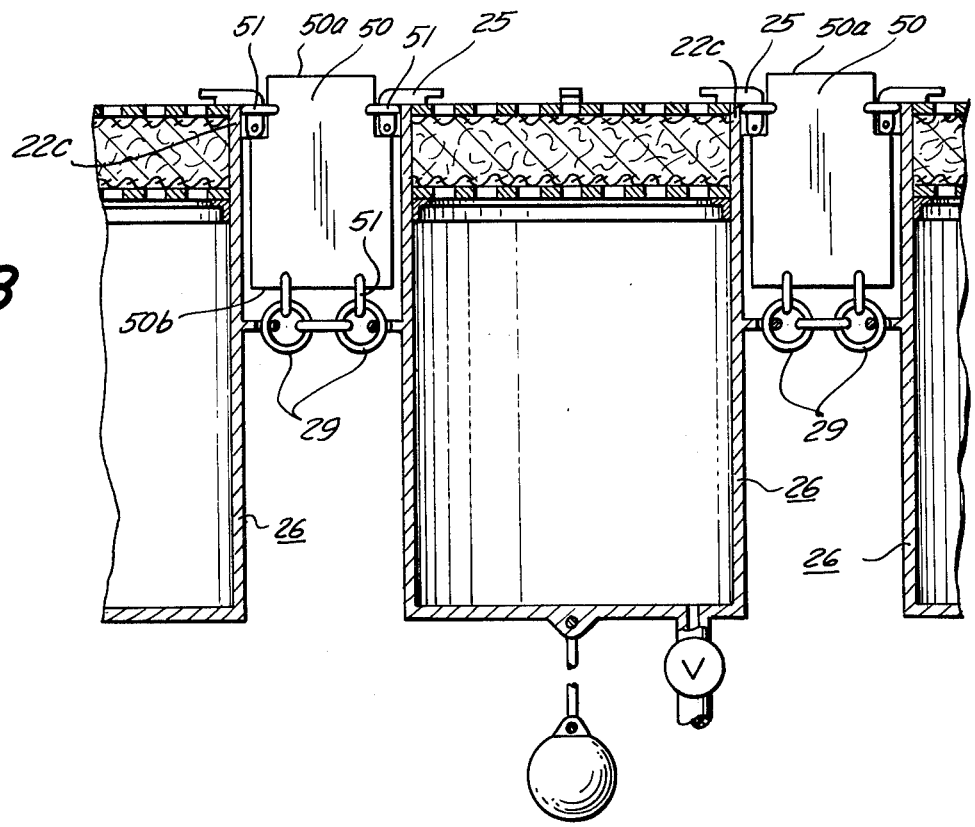
FIG. 8
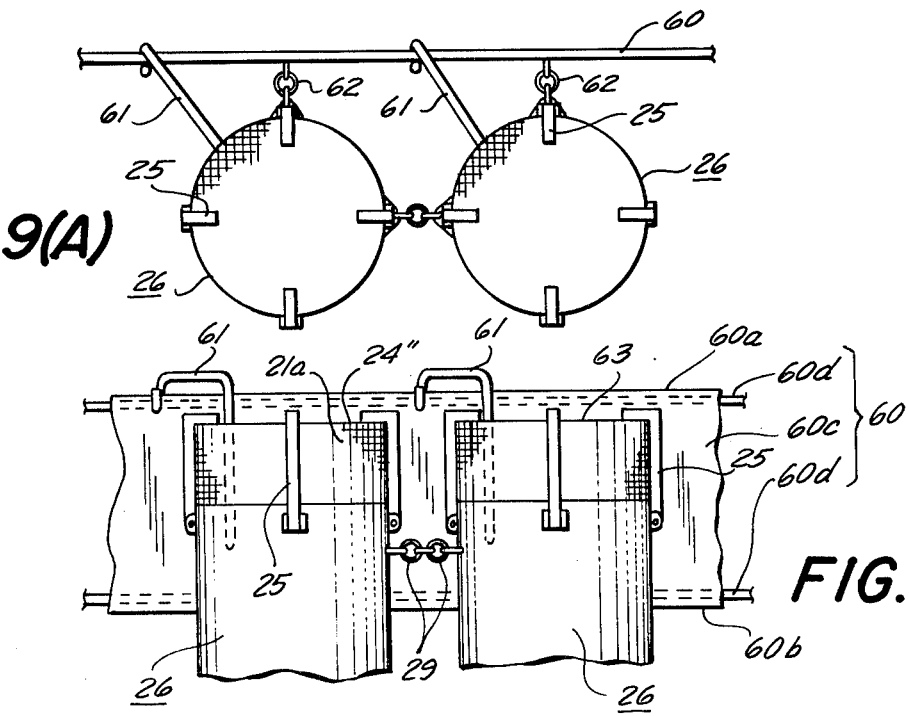
FIG. 9(A)
FIG. 9(B)

OIL ABSORBERS AND METHOD OF USING THEM

CROSS REFERENCE TO EARLIER APPLICATION

This is a continuation-in-part of the applicant's co-pending, earlier application, Ser. No. 665,175 filed Mar. 9, 1976, now abandoned.

BACKGROUND OF THE INVENTION

Various kinds of materials have hitherto been employed as an oleospecific absorbent for rapidly removing effluents such as crude oil, heavy oil and other oily substances which are flown out of an oil tanker or a tank lorry, etc., in the course of transportation by sea or overland so as to avoid pollution problems otherwise brought about by the accidental harmful effluents.

The above-mentioned oleospecific absorbing materials include straw, synthetic resin foam such as fibrous polymer material, polyurethane or the like, expanded perlite, and coir dust. Several, such as polymerized fiber and synthetic resin foam, are too expensive to be used as an oil-absorbing material for removing economically a large amount of oil floating on the water. The materials have also had only limited effect, as oil absorbents and water repellents, and have often been defective in generating harmful gases when the materials were burnt up, after having been employed for removing the effluent oil, thus causing a secondary pollution problem and other difficulties.

SUMMARY OF THE INVENTION

The present invention relates to an improved oleospecific absorber, comprising a body of porous substance obtained from a vegetable body, and disposed in an upper part of a container. The invention uses an oleospecific absorber having an excellent absorptivity for collecting oily substance, in particular for mineral oil, and utilizes the absorber with excellent effectiveness.

For this purpose, absorbers according to the invention comprise containers, each having an absorbent body—preferably a mass of porous coconut husk material, such as coir dust, impregnated with a hydrophobic-oleophilic substance—in an upper part of the container, and having a tank portion therebelow to collect oil absorbed by and released from the mass. Advantageously, the containers also have weights attached thereto and so selected that each container, in use, can float on the oil-covered water to be freed of the oil, regardless of whether the absorbent mass and the tank portion therebelow have or do not have oil therein. According to a further advantageous feature of the invention, the weighted containers have interconnecting means, so applied as to keep the containers in a predetermined arrray, as they float on the oil-covered water.

BRIEF DESCRIPTION OF THE DRAWINGS

FIG. 8 is a vertical sectional view of absorbers similar to that of FIG. 2 but showing a fourth modification of the use thereof and of its combination with other parts; and FIGS. 9(A) and 9(B) are, respectively, a partial plan view and a partial elevation, showing a fifth modification of the use and combination of the absorbers.

DESCRIPTION OF PREFERRED EMBODIMENTS OF THE INVENTION

Figure 1:
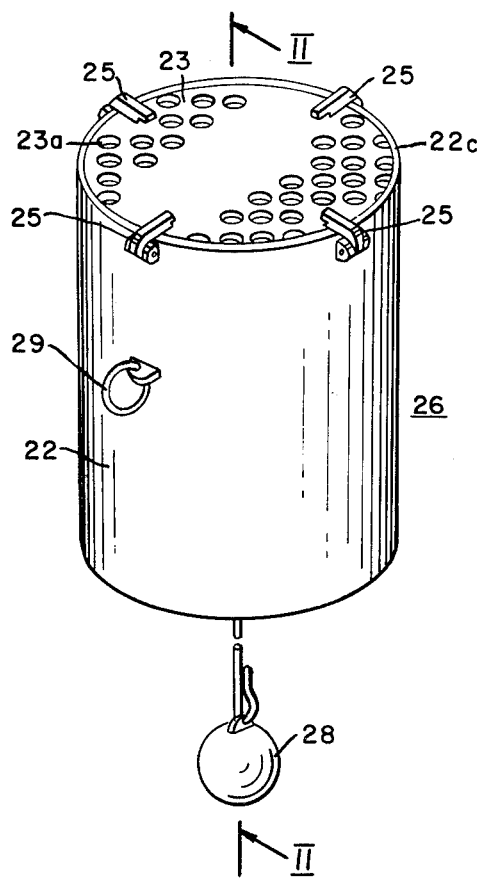
FIG. 1 is a perspective view of an oil absorber according to the invention.

Vegetable porous substance employed in the present invention includes so-called coir dust, produced in large amounts in the course of the treatment, for instance the retting, of husks of coconuts in water for separating fiber therefrom by manual operation or machinery. The coir dust thus produced is a mixture of materials in various irregular shapes such as small lumps having dimensions ranging from about 8 to 10 mm., particles having a dimension of about 5 mm., and fine pulverulent bodies having a dimension of less than 1 mm. The coir dust has an apparent specific gravity ranging from about 0.05 to 0.1 g./ml. It is subjected to a sieve analysis test for screening the dust into fine pulverulent material having the grain size of less than about 1 mm., and granulated material having a grain size ranging from about 1 to 3 mm.

The results of observing the properties of each of these kinds of screened coir dust are indicated in the following table.

| Category Sample | Bulk Specific Gravity (g/ml) | True Specific Gravity (g/ml) | Net Volume (ml/g) | All Fine Pore Capacity (ml/g) | Distribution of Fine Pores | | | Space Capacity (ml/g) |
|---|---|---|---|---|---|---|---|---|
| | | | | | Caliber 0.003–0.02 μ | Caliber 0.02–0.1 μ | Caliber 1.0–100 μ | |
| Grain Size below 1 mm | 0.0964 | 0.72 | 1.389 | 5.0 | 0.46 | 0.16 | 4.38 | 3.774 |
| Grain Size 1–3 mm | 0.0322 | 1.45 | 0.690 | 6.0 | 0.28 | 0.34 | 5.38 | 9.387 |

The coir dust, thus obtained by separating coir from the husk of coconut, can be used without any other treatment, but is, in many cases, advantageously employed after pretreatment. The grain size thereof is desirably made uniform by a screening process either plain or with a preparatory grinding step prior to the screening process. The coir dust may include coir mixed therewith, so that the husk of coconut can directly be ground or cut to a proper shape and dimension to be applied to the foregoing purpose. Desirable grain size of the coir dust is particularly preferred to be in the range of about 0.5–3 mm. however, the grain size is not limited to the aforementioned range in the present invention.

By a further pretreatment, the porous material mentioned hereinbefore, is provided with a water repellent property by impregnating it with a suitable hydrophobic material in an appropriate quantity. It has been found that, as a result of the impregnation process, the porous material can further be improved with respect to its absorbing an oily substance co-existent with water. The content of the hydrophobic material, provided by means of the impregnation process to make the porous material water repellent, may advantageously be in the range of about 0.5–200% by weight to the weight of the porous material, preferably in particular ranging from about 2% to 50% by weight. This hydrophobic material includes such kinds of mineral oil as naphtha, kerosene, light oil, paraffin, heavy oil, crude oil, asphalt, etc.; surface active agent having oleophilic property as well as hydrophobic property; animal and vegetable oil, fat and wax; fatty acid and the like; metallic soap, silicone, etc. The hydrophobic material can be impregnated in an appropriate amount thereof into the porous material by means of spraying, or another process may be carried out in which the porous material is dipped into the hydrophobic material and then the excess quantity of the impregnated hydrophobic material can be adjusted to a proper amount by being placed on meshes or the like for a certain period of time, or by being compressed to remove the excessively impregnated material therefrom. Still another pretreatment process may be carried out by subjecting the hydrophobic material to vaporization treatment for depositing it on the porous material. The porous material may previously be dried, in case it contains water, at a temperature ranging from about 50° to 200° C., being subsequently subject to water repelling treatment with the hydrophobic material.

An experimental test was conducted with reference to two types of porous materials, one of which was subjected to the water repelling treatment and the other of which was free of the treatment, as to the amounts of absorbed mineral oil as well as water. The amount of mineral oil absorbed by each of the porous materials came to the extent of about 5 to 20 times as much as the weight of the porous material. On the other hand, the amount of water absorbed by the latter was found to be about 2 to 3 times as much as the weight of the porous material, while the water absorbed by the former was about one-half of the amount absorbed by the latter.

A body of the oil absorbing material is contacted with an effluent of mineral oil or the like, particularly with oil floating on water, for example floating on the sea, to absorb the effluent or oil rapidly, by virtue of its excellent oleospecific absorbing ability. It can be disposed of by incineration, since the porous substance is made of vegetable matter and will never cause any secondary pollution problem by generating harmful gases.

The collecting apparatus or absorber of the above-mentioned oil and the like, can be subjected to treatment with a centrifugal separator or a compressor, to be separated from the absorbed oil for salvage. The material fully effects absorbing-including adsorbing-of an oily substance contained in waste water or the like in an emulsion state for collecting in the same way as mentioned above.

The body of porous material is advantageously enveloped within an oil permeable sheathing material such as, for instance, a bag made of woven fabric, nonwoven fabric, knitted cloth, metal, fiber, or plastic net, synthetic resin film, each of which is formed with textures, stitches, pores, clearances and the like to be impermeable of the porous material enveloped in the bag.

Figure 2:
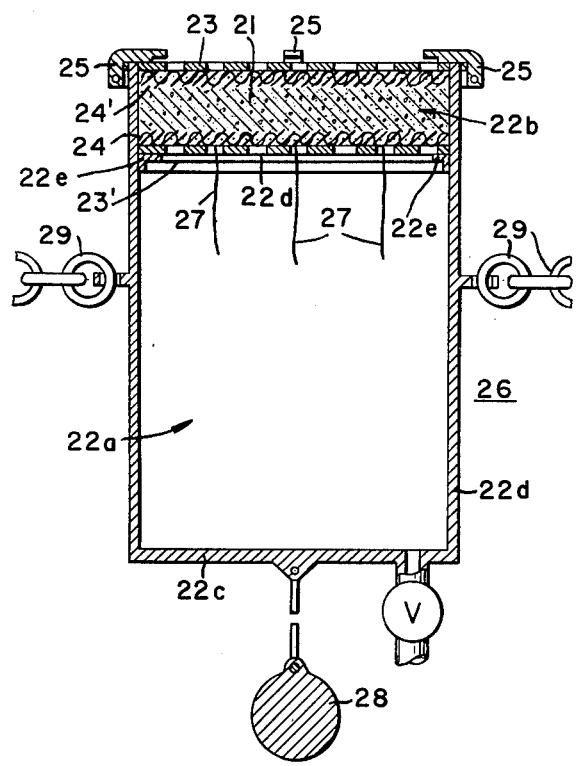
FIG. 2 is a vertical sectional view taken along the line II of FIG. 1.

FIGS. 1 and 2 show an oil absorber and collector, in the form of a container or tank 26 having an initially empty lower part 22a and an upper part 22b fitted with absorbent 21. The tank has a bottom 22c and a sidewall 22d. It will be seen, also from the drawings, that the container is rigid, so that it can separate the empty lower part from the absorbent-fitted upper part.

Figure 5:
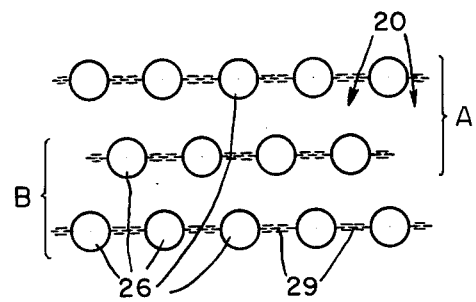
FIG. 5 is a plan view drawn on a smaller scale and showing oil absorbers in use according to the invention.

As best shown in FIG. 5, containers 26, interconnected by catch or chain members 29, are distributed on an oily layer 20, floating for example on the ocean. For this purpose, if a chain 29 is disposed between every two containers 26, a first longitudinal series 26-29-26-29 is provided in front of a second, generally similar series, disposed so (at A) as to keep its containers behind the chains 29 of the first series, to prevent oil 20 from escaping between the containers of the first sequence. As illustrated, a third series is similarly connected at B; and of course still further series can be added.

The containers 26 are able to float on the water surface. They are thrown on the oil layer 20, in the necessary number, corresponding to the depth of the effluent oil and the area of the water spread-over thereby. The containers 26 are conjoined with one another by chain means 29 to form an oil fence, preventing diffusion of the oil and making it possible to collect the oil encompassed by the oil fence.

In case of the containers being formed into an oil fence by mutual conjunction, with clearance between the containers, the clearance can also be blocked with a proper shield plate.

When the containers have been substantially filled with oil, they are gathered, for the oil to be disposed of. In some instances, the absorbent itself, with or without the bag containing it, is disposed of at the same time.

The container 26 can be made of an iron sheet or synthetic resin sheet, desirably cylindrical and with a capacity of about 50 to 500 liters. The upper part 22b of the container is fixedly covered with upper and lower perforated sheets 23,23' the perforations 23a desirably having about 10 mm. diameter and being relatively closely spaced, as shown. The top surface of the lower perforated sheet 23' is spread over with woven fabric 24 or muslin, such as "Victoria lawn," which prevents the porous material from passing through perforations 23a, while being permeable to the oil and water. Body 21 of absorbent is supported by sheet 24, and is typically some 180 to 200 mm. deep.

Another woven fabric 24' is laid over on the absorbent layer 21, and the upper perforated sheet 23 is placed over this woven fabric 24' to be detachably fitted to the peripheral inner surface of the container, by suitable stop members.

The extent of filling-up of the upper container portion between plates 23 and 23', with absorbent is properly controlled, so as not to allow any clearance between the layer of absorbent 21 and the upper perforated plate 23 by reducing the volume of the absorbent, when any shock or vibration is given to the absorbent during handling and transportation of the apparatus. In order to prevent such a clearance, the upper perforated plate is desirably resilient, or is designed to keep pressed the absorbent layer downwardly by use of a spring such as a coil spring interposed between the upper perforated plate 23 and the stopper (25).

The apparatus 26 is further provided with a suitable number of induction pieces, filaments or strips 27 made of string, wire or other material which are secured to fabric sheet 24 to promote dripping of oily substance, from the porous material layer 21, to be stored on the bottom part of the container 22 when the porous material layer comes to be saturated with adsorbed oily substance and which are further efficacious for accelerating the adsorptivity of the porous material layer to the oily substance.

Furthermore, the container 26, as shown, has a suitable buoyancy adjusting means in the form of a weight 28 suspended from the lower surface of the container bottom 22c; thus when the oil collecting apparatus is employed in the operation, the oleospecific adsorbing layer 21 provided in the upper part of the container is constantly kept on top and in contact with the layer 20 of floating oily substance. Even when the bottom 22a of the container is filled with the collected oil, and the container sinks correspondingly, the upper edge 22c of the container is still kept at the surface of the sea water, or in the floating oil layer 20, by suitable selection of the buoyancy adjusting weight 28.

Moreover, the container 26 is provided at the outer surface of its sidewall 22d with catch ring or chain members 29 which members are serviceable, as a supporting point for handling the container in case of the container being thrown about in the layer of floating oily substance, being moored or conjoined together in a large number thereof, or being landed when the collector is full of adsorbed oily substance.

The symbol V in FIG. 2 indicates an outlet valve of the recovered oil in the container 26.

In use, and in accordance with the new method, containers 26 are thrown into the floating oil on the ocean. They can be interconnected by means of connecting rings 29. The absorbent bodies contact the floating oil. Only the oil is absorbed in the absorbent of the container; water is not absorbed due to the water repellent property of the absorbent.

When the absorbent is saturated with the absorbed oil, the absorbed oil separates from the absorbent, drips along the leading pieces 27, and is finally collected in the bottom part 22a of the container. The absorbent body separated from absorbed oil as noted above, can be re-used to absorb floating oil.

When the absorbed oil fills the container bottom portion, or when the oil collecting operation is over, the containers are handled as follows: They are raised from the sea for example, by means of a crane or the like to the deck of a ship. There follows the opening of an exhaust valve V on each container, to drain the oil into storage tank in the ship. When this has been done, and the absorbers have been pressed out, the containers can, again, be thrown on the ocean to renew the oil absorbing operation.

Figure 3:
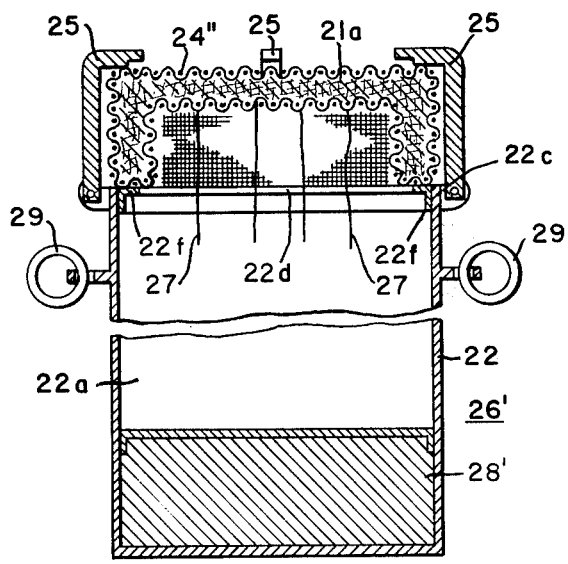
FIG. 3 is a view similar to FIG. 2 showing a modified embodiment.

In container 26 of FIGS. 1 and 2, absorbent mass 21 is held between flat sheets 24, 24' of fabric, with the aid of plates 23, 23'. Sheets of coconut fibers may be used, instead. Also, as shown in FIG. 3, an absorbent mass 21a can be held in a bag 24", on a container 26'. Such a bag can have a horizontal part and an outer vertical part, as shown. It can consist of natural fibers such as animal, vegetable and mineral fibers; or of man-made fibers such as inorganic or regenerated or, synthetic fibers or the like. Among the above-enumerated fibers it is preferred to use coconut fiber, hemp-palm fiber, or a fiber made of nylon or saran, each of which has high proper rigidity and elasticity.

According to a modification in the formation of the fibrous layered structure, the cross-bridging parts of fibers are caused by a bonding agent to adhere to one another. Also, a porous material for holding fibers may sometimes be adhered to the fibers, at the surface thereof, by a bonding agent.

The above-described bags have an excellent permeability for the oil to be collected. Accordingly, when the collector is thrown on an oil layer, it is effective for collecting the oily substance by adsorption rapidly and with greatly improved efficiency by cooperation with the oleospecific adsorbing property of the material.

Figure 4:
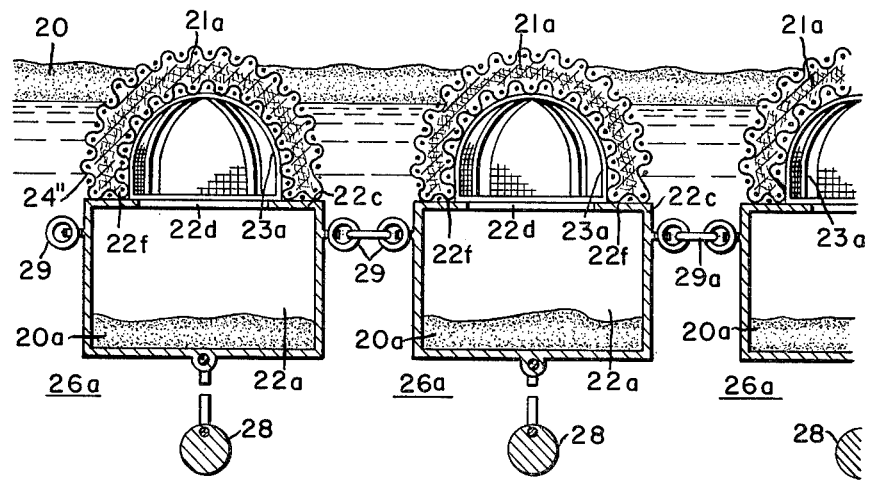
FIG. 4 is a similar view of another modified embodiment.

In each container 26a of FIG. 4, there is provided an arcuate, oil-permeable supporting frame 23a extending upwardly from the upper end of the container; and at the outer periphery the frame body 23a is detachably surrounded with an adsorptive material layer 21a composed of porous material enveloped by a cloth 24". In this case the absorbed oil drips into the lower container portion 20a through frame 23a. Layer 21a is dome-like.

The containers are conjoined with one another in such a manner as to connect catch ring members 29 provided on the outer periphery of each container by means of couplings. Thus the apparatus is utilized to form an oil fence and is also effective to be used as a collecting apparatus of adsorbed oily substance.

Each of the containers described herein can be used for collecting oily substance floating on the water surface, whereafter the collected oil can be fed into a large-sized tank, a pond or the like.

Figure 6:
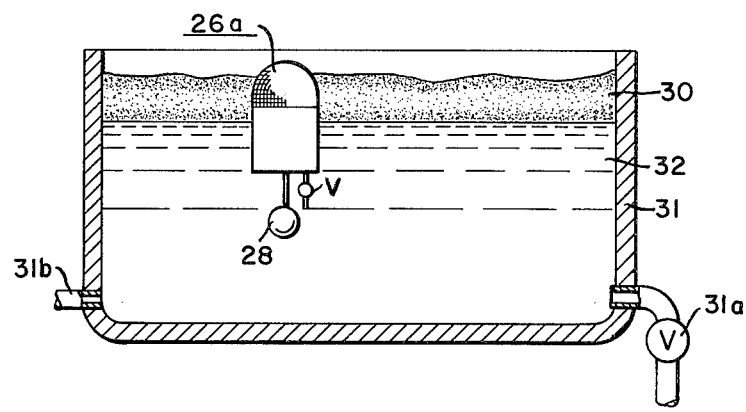
FIG. 6 is an elevational view, partly in vertical section, showing a modification of the use of a single absorber similar to those of FIG. 4.

FIG. 6 shows a collecting apparatus 26a similar to that of FIG. 4 within a larger tank 31. The numeral 31a indicates an outlet valve for water. The numeral 31b indicates an inlet pipe of a mixture of oil and water. The numeral 30 here indicates the oil layer floating on the body of water 32.

Figure 7:
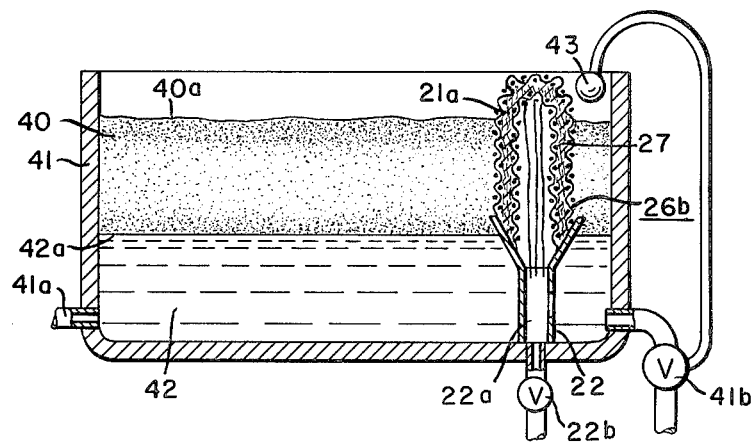
FIG. 7 is a view showing a modified absorber, differently used.

FIG. 7 shows an oil adsorbing and collecting container 26b fixedly provided within a larger tank 41, and formed as a structure generally similar to the containers shown in FIGS. 4 and 6. This container discharges continuously, through an exhaust pipe 22b, oily substance collected by adsorption in porous material layer 21a and stored in the bottom 22a of the container. In this instance, the tank 41 is provided with an inlet port 41a and an exhaust port 41b, serving respectively for feeding in and discharging water to adjust the height of the water surface 42a in the tank. It may also be provided with an indication member 43 for maintaining the uppermost surface 40a of oil layer 40 stored in the tank.

FIG. 8 shows an oil fence, connecting absorbers of FIGS. 1 and 2, in series. A shield plate (50) is made of synthetic resin (for example, polyvinyl chloride resin). The plate is vertically placed between two adjacent containers (21), (21), and the upper portion (50a) of the plate is at least 5–10 cm. higher than the upper portion (22c) of the absorbing apparatus, while the lower portion (50b) of the plate extends to the desired depth of the water. The plate is detachably conjoined with the containers through a hook (51). The lower portion of the plate is hung by the ring member (29), and the upper portion by the stopper (25).

FIG. 9 shows an oil fence connecting the absorbers of FIG. 3, in series. A belt-like shield plate (60) is provided along the apparatus connected in series. That is, a sheet (60c) made of coarse cloth of synthetic fiber or net of fine mesh, is fixed and vertically held by two ropes (60d) made of synthetic fiber. The shield plate is suspended from each container (21) by a supporter (61) so that the upper portion (60a) of the plate is about 5-10 cm. higher than the upper surface (63) of the bag (24") containing the absorbent mass (21a) in the apparatus, while the lower portion (60b) is suspended from each container through a stopper (62).

Further modifications are possible. For example, a shield plate generally similar to that of FIG. 8 can be composed of two mutually engageable plastic plate portions hinged to mutually confronting portions of respective containers (26) and interengaged at extreme points by bent-over and mutually interengaging, vertical edge portions of the plate portions. Also, a shield plate generally similar to that of FIGS. 9(A), 9(B) can be made as a horizontal series of plate portions, each having a curved or semicircular shape partly surrounding an absorber.

The combinations of absorbers and shield plates, built up as illustrated and described herein, can effectively absorb and collect the floating oil.

It is to be understood that the present invention is not limited to the above-described embodiments thereof, but may be otherwise variously modified within the scope of the invention set forth in the following claims.

I claim:
1. An oil fence, comprising;
a plurality of oil absorber collector means, each including a container, a body of porous material, including coir dust impregnated with a hydrophobic-olephilic substance, disposed in an upper part of the container for contact with oil floating on the sea and surrounding the container, to absorb such oil by the body, said body functioning to enable oil to pass therethrough to said container while simultaneously repelling the passage of water therethrough; means for causing absorbed oil to drip into a lower part of the container and to be collected therein, means for enabling the container to float in the oil floating on the sea, means for withdrawing collected oil from the container; and
connector means for flexibly interconnecting the containers.

* * * * *